Patented Feb. 9, 1943

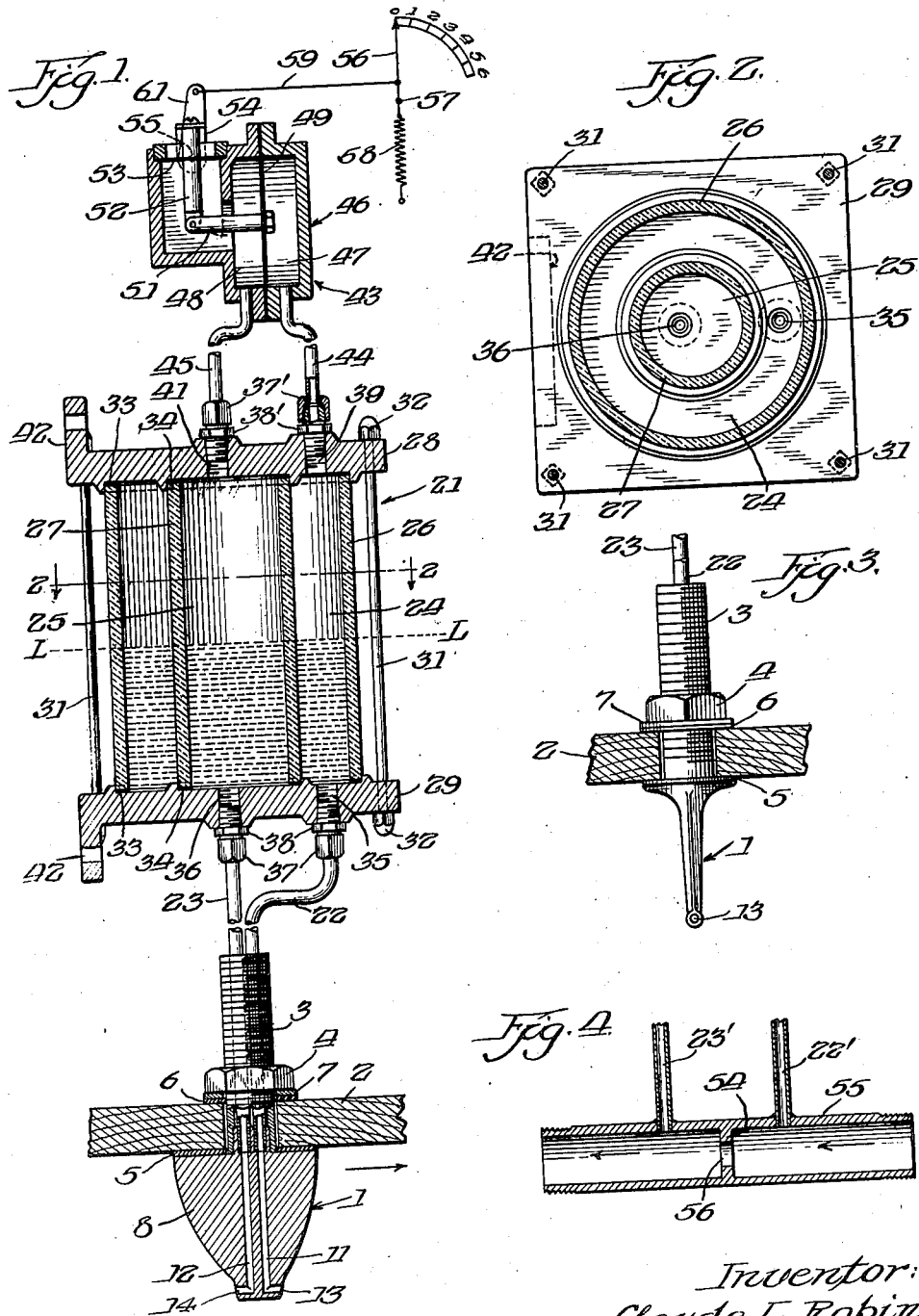

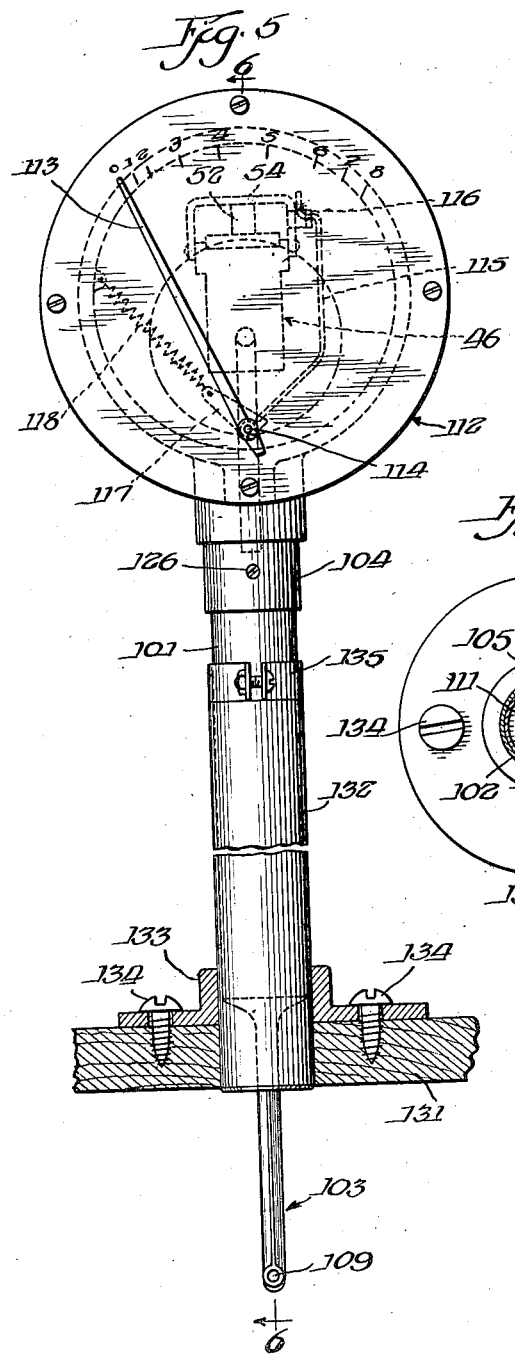

2,310,546

UNITED STATES PATENT OFFICE 2,310,546

VELOCITY MEASURING DEVICE

Claude L. Robinson, Michigan City, Ind., assignor to Consolidated Instruments Corporation, Michigan City, Ind., a corporation of Indiana Application May 3, 1940, Serial No. 333,206

5 Claims. (Cl. 73—205)

The invention relates generally to measuring or indicating devices, and more particularly to devices for indicating the rate of flow of liquids or the rate of movement of an object through a liquid, as for example, a speed indicator for boats or the like.

The device has among its objects the production of an indicating system having means for developing two pressures, the difference between which will bear a definite relation to the rate of liquid flow or the movement of an object through a liquid, said system utilizing both hydraulic and pneumatic pressures in the transmission of the pressure differential to a point remote from its generation, where such differential may be measured by suitable means to indicate the relative liquid flow or object movement.

An important object of the invention is the production of such a system having means for accurately balancing or equalizing the two pressure sides of the system when the latter is under static pressure.

Another object of the invention is the production of such a balancing or equalizing means constructed in part of transparent material by means of which leaks, stoppage, accumulation of excess air in the system, etc., may be readily detected and corrected.

A further object of the invention is the production of such a system which when out of balance may be easily and simply adjusted to restore the normal balance or equalization.

A further object of the invention is the production of such a system which may be readily utilized for measuring and indicating the rate of flow of corrosive, inflammable and other dangerous fluids which might have a destructive action upon the interior of the pressure differential meter, and cases where it is undesirable or impossible to transmit the fluid pressure over long distances through the medium of the fluid itself.

A further object of the invention is the production of such a system which is especially adapted for use as a speed indicator for boats or the like, such a device constructed in accordance with the present invention being substantially unaffected by temperature changes, boat loads, rolling of the boat, or other changes in pressures such as waves, etc., that would otherwise tend to introduce inaccuracies and errors in speed indicators.

A further object of the invention is the production of such a speed indicator constructed as an integral unit which may be removably mounted in the boat by means of a suitable well or the like, the unit being readily installed or removed therefrom.

Many other objects and advantages of the invention herein shown and described will be obvious to those skilled in the art from the disclosure herein given.

To this end my invention consists in the novel construction, arrangement and combination of parts herein shown and described and more particularly pointed out in the appended claims.

In the drawings wherein like reference characters indicate like or corresponding parts:

Fig. 1 is an elevational view in section of the invention as applied to an indicating system for boats or the like;

Fig. 2 is a sectional view through the equalizing unit taken substantially on the line 2—2 of Fig. 1;

Fig. 3 is an end elevational view of the pressure differential generating foot illustrated in Fig. 1;

Fig. 4 is an elevational sectional view of a pressure differential generating device of the so-called "obstruction to the flow" type for use in pipe lines or the like for measuring the rate of flow of fluid therein;

Fig. 5 is a front elevational view of a unitary speed indicator for boats embodying the present invention;

Fig. 6 is a vertical sectional view taken along the line 6—6 of the device illustrated in Fig. 5; and Fig. 7 is a sectional view taken substantially on the line 7—7 of Fig. 6.

The present invention is particularly adapted to be used for measuring the speed of a boat or other object, as well as measuring the flow of fluid in conduits or the like where for one reason or another, it is not desirable or not possible to have the fluid come in direct contact with the indicating instrument. In the past, such systems, due to their design, were affected by temperature and when used in a boat or other vessel, were affected by various extraneous conditions causing errors in indications and necessitating numerous and sometimes complicated adjustments.

The invention is illustrated in Fig. 1 in conjunction with a speed indicator for a boat or the like, which comprises a foot designated generally by the numeral 1 extending through the bottom 2 of a boat hull. This foot is provided with a threaded stem 3 which extends through the bottom 2 and is held in place by means of a suitable nut 4, gaskets 5 and 6 preventing leakage between the parts, and a washer 7 being interposed between the nut 4 and gasket 6. The outer end 8 of the foot is constructed in the form of a longitudinally extending plate and is provided with passages 11 and 12, respectively. These passages terminate in ports 13 and 14, respectively, the port 13 being forwardly positioned and the port 14 rearwardly positioned with respect to the boat hull, the normal motion of the boat being in the direction of the arrow. The action of this foot in the water is similar to that of the "up and down stream" Pitot tube and is familiar to those skilled in the art.

An equalizing or balancing unit, designated generally by the numeral 21, is operatively connected by means of tubing 22 and 23 with the foot 1. The unit 21 is provided with a pair of chambers 24 and 25, the latter being formed by concentric tubing 26 and 27 of suitable material, preferably transparent, and top and bottom plates 28 and 29. The latter are of similar shape and are securely maintained in engagement with the tubing 26 and 27 by tie rods 31 extending between the two plates and secured by cap nuts 32 so that the plates are drawn toward one another, securely clamping the tubing 26 and 27 in position. Gaskets 33 and 34 interposed between the ends of the tubing 26 and 27, respectively, and the end plates 28 and 29 effectively render the chambers 24 and 25 fluid tight. The bottom plate 29 is provided with ports 35 and 36 communicating with the chambers 24 and 25. The connecting tubing 22 and 23 connects with the ports 35 and 36, the tubing terminating in couplings 37 which are engageable with nipples 38. Thus, the port 13 of the foot 1 is operatively connected through tubing 22 with the chamber 24 while the port 14 is similarly connected by tubing 23 with the chamber 25. The unit 21 is preferably positioned substantially at normal water level so that the chambers 24 and 25 will be partially filled with water when the boat is at rest and the system under static water pressure. The upper plate 28 is provided with ports 39 and 41 similar to the ports 35 and 36. Flanges 42 on the plates 28 and 29 provide means for mounting the unit to any suitable support.

An indicating device designated generally by the numeral 43 is connected with the ports 39 and 41 by tubing 44 and 45, the latter being secured to the plate 28 by couplings 37' and nipples 38'. The indicator illustrated comprises an actuating unit having a housing 46 divided into chambers 47 and 48, the latter being separated by a flexible diaphragm 49. Tubing 44 connects chamber 24 of the unit 21 with the chamber 47 of the indicating device, while tubing 45 connects chamber 25 of the unit 21 with the chamber 48, whereby pressure differentials will be transmitted from the unit 21 to the indicating device causing diaphragm 49 to move toward the low pressure chamber 48. An arm 51 is secured to one end of the center of the diaphragm 49, and connected at the opposite end to a second arm 52, the latter passing through a sealing diaphragm 53 and rigidly secured to a U-shaped saddle member 54, which is pivotally secured to the housing 46 at 55, the axis of rotation of the saddle member lying substantially in the plane of the sealing diaphragm 53, arm 52 and saddle member 54 coacting as a unitary member so that the arm 52 pivots on the points 55. An indicating hand 56 is rotatably secured to the device, the hand rotating about the point 57, and a spring 58 anchored at one end, and secured at the opposite end to the adjacent end of the indicating hand. A link member 59 connects the hand 56 and an extension 61 of the saddle member 54, thus completing the assembly for transmittal of movement from the diaphragm to the indicating hand. While the present invention is illustrated in connection with the indicating device just described, it will be apparent that any suitable instrument designed for use in systems having both high and low pressure sides may be utilized. Consequently, the particular indicating device illustrated does not constitute a part of the present invention other than in combination with the other elements of the system.

Installation of the device is as follows:

The foot 1 is mounted on the hull of the boat substantially as shown in Fig. 1, the foot being preferably centrally positioned. The unit 21 is preferably positioned in a vertical position and operatively mounted with the foot by means of tubing 22 and 23. As previously mentioned, the unit 21 is preferably positioned at the normal water level so that upon opening of the ports 39 and 41, the water will rise to the approximate level L. The indicating device 43 is mounted in the boat wherever desired and connected by means of tubing 44 and 45 to the unit 21.

Upon movement of the boat in the direction of the arrow through the water, the resistance of the water to the passage through it of the foot 1 will result in an increased pressure of water at the opening 13 and a decreased pressure at opening 14, the action being substantially the same as that of the usual up and down stream Pitot tube. Increased pressure at the opening 13 will cause the water level in the chamber 24 to rise, compressing the air thereabove, while the decrease in pressure at the port 14 will cause the water level in chamber 25 to lower due to the expansion of the air thereabove. The difference in air pressures in the chambers 24 and 25 is transmitted through tubing 44 and 45 to chambers 47 and 48 of the indicating device where the increased pressure in chamber 47 and reduced pressure in chamber 48 will cause the diaphragm 49 to move in the direction of chamber 48, the diaphragm movement in turn moving the arms 51 and 52, the latter rotating with the saddle member 54 about an axis passing through the plane of the sealing diaphragm 53. Movement of the saddle member 54 will move extension 61 thereof, which movement will be transmitted through link member 59 to indicating hand 56, causing the latter to pivot about the point 57 until the applied pressures are balanced by the spring 58, thus indicating the differences in pressure between the two sides of the system which is proportional to the speed of the boat through the water, the dial of the indicator being graduated in miles per hour, etc. Should the system develop any leaks, etc., this will be readily apparent by examination of the transparent portions of the equalizing unit 21 which will disclose the water levels in the two chambers to be at different heights when the boat is at rest and the system under static pressure. Likewise, the gradual accumulation of air bubbles in the system will result in the levels of the water in the two chambers being at improper height when the boat is at rest. The system can in such cases be returned to normal by unloosening the couplings 37', allowing air to enter or escape from the chambers, whereby the water levels will be restored to normal, and in case of stoppage, etc., foreign matter may be blown from the tubes, etc., by compressed air or cleaned by other suitable means. While the equalizing unit is illustrated with concentric chambers, obviously it may be constructed of any suitable shape and relation to achieve the desired results.

The invention may also be used to measure the rate of flow of fluid in conduits or the like. This is accomplished by merely substituting any of the usual pressure differential generating devices for the foot 1, the remainder of the system being substantially as that illustrated, the scale graduations of the indicating device also being changed to correspond to the particular units of measurement used. Illustrated in Fig. 4 is one form of such differential generating means comprising a plate 54 positioned in a conduit 55, the plate having an orifice 56 of smaller area than that of the conduit so that a pressure differential will be built up on opposite sides of the plate. Tubing 22' and 23' would then be connected with the ports 35 and 36, respectively, of the equalizing unit 21. If the movement of the fluid in the conduit 55 is in the direction of the arrows, a relatively high pressure will be transmitted through the tubing 22' to the chamber 24 and a relatively low pressure by means of the tubing 23' to the chamber 25.

It will be noted that in both the constructions illustrated in Figs. 1 and 4, the static pressure of the water when the boat is at rest or the static pressure of the fluid in the conduit 55, as the case may be, will have no effect whatsoever on the readings or action of the indicating device as both the high and low pressure sides of the system will be under the same static pressure. Consequently, rolling of the boat and sudden changes of pressure due to waves, etc., as well as temperature changes, will have substantially no effect upon the system as both sides of the latter are substantially equally affected. Similarly, an increase or decrease of the static pressure in the conduit 55 will not alter the setting or reading of the indicating device. In either construction, only the pressure differentials are indicated, the static pressures being substantially immaterial.

It will also be noted that the indicating device may be positioned as desired due to the translation of the liquid pressures into air pressures. Consequently, it is immaterial at what height above the equalizing unit 21 the indicating device is placed as the liquid is not transmitted directly to the indicating device. As the areas of the respective chambers 24 and 25 are greater than the area of the conduits 22 and 23, the effective pressure area of the water level is increased so that a larger volume of air will be displaced at low speeds, insuring adequate movement of the diaphragm 49. The use of air or other gas in the major portion of the system also permits its use for measuring the flow of corrosive inflammable liquids or the like which might have a tendency to injure or otherwise affect the indicating device if the liquid was brought directly to the indicator.

The device illustrated in Figs. 5, 6, and 7, designed for use as a speed indicator on a boat, embodies the general principles of construction previously described. The device, however, is constructed as a single integral unit which may be removably mounted in a boat so that it need not remain on the boat when the latter is not in use, the device being particularly adapted for use on small boats or the like.

As illustrated in Figs. 5 and 6, the device comprises a pair of concentric tubes 101 and 102 of metal or other suitable material. Secured to the lower ends of the tubing is a pressure foot designated generally by the numeral 103, and to the opposite ends of the tubing is secured a cap member or block 104. The tubing 101 and 102, foot 103, and cap member 104 form concentric chambers 105 and 106. The foot 103 is provided with a forwardly facing opening or port 107 connected with the chamber 105 by a passageway 108 and a rearwardly facing opening or port 109 connected by a passageway 111 with the chamber 106. The foot 103 and chambers 105 and 106 function in the same manner as the foot 1 and chambers 24 and 25 of the construction shown in Fig. 1. Carried by the member 104 is a pressure differential indicating instrument designated generally by the numeral 112, this indicating device being constructed in any suitable manner, the particular construction disclosed similar to the indicating device 43 merely illustrating one form of suitable device. Obviously, any pressure differential indicating device having both a high and low pressure side may be employed, the specific construction of which does not form a part of this invention.

The device illustrated is substantially the same in operation as that of Fig. 1, the actuating means being of substantially the same construction, the indicating hand 113 in this construction being rigidly secured by the shaft 114 rotatably carried by the device. Link member 115 is secured at one end to extension 116 of the saddle member 54 of the actuating unit and at the opposite end with arm 117, secured to the shaft 114. A spring 118 is secured at one end to the arm 117 and anchored at the opposite end to a relatively fixed portion of the device. A change in pressures upon the diaphragm 49 will actuate arms 51 and 52, rotating saddle member 54 and extension 116 thereof. Movement of the latter will be transmitted by link member 115 to arm 117, causing rotation thereof and with it the indicating hand 113 until force of spring 118 balances the applied pressures.

Secured to the bottom 131 of the boat is a tubular well 132 of a size to receive the tube 101 and foot 103. The well 132 may be secured to the bottom of the boat in any suitable manner, as for example, by the flange 133 and screws 134. The flange 133, if desired, may be constructed to position the well 132 vertically regardless of any angle or slope of the bottom 131 of the hull, after which the well may be permanently secured to the flange by soldering or other suitable means. A clamp member 135 may be provided which may be locked to the tube 101, the clamp resting upon the upper end of the well 132 whereby the device may be vertically adjusted with respect to the bottom of the boat.

The operation of the device is as follows:

The well 132 and tubing 101 and 102 are of a length to extend above the normal water level of the boat. In use, the device is inserted in the well 132, as shown in Figs. 5 and 6, and the plugs 126 removed, whereupon the water will rise into the chambers 105 and 106, leaving an air space at the top of each similar in manner to the unit 21. The plugs 126 are then inserted to seal the system which will then function substantially as that illustrated in Fig. 1. A pressure will be formed at the port or opening 107 which will cause a rise of water in the chamber 105, and similarly, the lower pressure at the opening 109 will cause a lowering of the water level in the chamber 106, thereby causing an air pressure differential between the chambers 105 and 106. This air pressure differential is transmitted by tubing 122 and 124 and passageways 123 and 125 to the indicating device 112, where the pressure differential between the chambers 47 and 48 of said device will cause a movement of the diaphragm 49, and indicating hand 113 through the connecting mechanism. When the boat is not in use, the device may be removed from the well 132 to a place of safe-keeping, thereby eliminating any possibility of theft or damaging of the instrument, while not in actual use. This construction likewise will not be affected by temperature changes or sudden change of water pressure due to waves, rocking of the boat, etc.

It will be apparent from the foregoing description that I have provided a measuring device of relatively simple construction, by means of which indications may be transmitted over distances by means other than the original liquid measured. Likewise, I have provided an indicating system which may be readily adapted for use as speed indicators for boats or the like, which is very efficient for such purposes, and which if desired may be constructed in the form of a portable unit that may be readily installed or removed from the boat. Furthermore, that I have provided novel means for equalizing and balancing both sides of the system when the latter is at static pressures, and by means of which leaks and other disturbances in the system may be readily detected.

Having thus described my invention, it is obvious that various immaterial modifications may be made in the same without departing from the spirit or scope of my invention; hence, I do not wish to limit myself to the exact construction, arrangement, and combination of parts herein shown and described or uses mentioned.

What I claim as new and desire to secure by Letters Patent is:

1. A differential indicating device for indicating the rate of flow of a fluid, comprising a pair of walled receptacles disposed in spaced relation with the walls of both forming one chamber and the wall of one a second chamber, closure means for sealing said chambers, a foot carried by at least one of said receptacles and adapted to be positioned in the fluid, said foot having oppositely disposed ports therein communicating with the respective chambers, a differential indicating unit carried by at least one of said receptacles at the end thereof opposite said foot, said indicating unit being operatively connected to the upper portions of the respective chambers.

2. A differential indicating device for indicating the rate of flow of a fluid, comprising a pair of concentric tubes connected at spaced points to form a pair of chambers, a foot carried by at least one of said tubes, adapted to be positioned in the fluid, said foot having opposite disposed ports therein communicating with the respective chambers, a differential indicating unit carried by at least one of said tubes at the end thereof opposite said foot, said indicating unit being operatively connected to the upper portions of the respective chambers, and means for selectively admitting air into or expelling air from said chambers.

3. A differential indicating device for indicating the rate of flow of a fluid, comprising a pair of concentric tubes connected at spaced points to form a pair of chambers, a foot, carried by at least one of said tubes, adapted to be positioned in the fluid, said foot having oppositely disposed ports therein communicating with respective chambers, and a differential indicating unit carried by at least one of said tubes at the end thereof opposite said foot, said indicating unit being operatively connected to the upper portions of the respective chambers, the latter having vents therein for selectively admitting air into or expelling air from said chambers, and means for operatively mounting said device in an object, comprising a sleeve having one end thereof secured to the object and communicating with the fluid, the other end being positioned above the fluid level, said sleeve being of a size to receive said device with said foot extending therefrom into the fluid, and further means for supporting the device in said sleeve.

4. A differential indicating device for indicating the rate of flow of a fluid, comprising a pair of concentric tubes, caps connecting the tubes at their ends to form a pair of chambers, a foot carried by one of said caps and adapted to be positioned in the fluid, said foot having oppositely disposed ports therein communicating with respective chambers, and a differential indicating unit carried by another one of said caps, said indicating unit being operatively connected to the upper portions of the respective chambers, the latter having vents therein for selectively admitting air into or expelling air from said chambers, and means for operatively mounting said device in an object, comprising a sleeve having one end thereof secured to the object and communicating with the fluid, the other end being positioned above the fluid level, said sleeve being of a size to receive said device with said foot extending therefrom into the fluid, and further means for supporting the device in said sleeve.

5. In a differential speed indicating device for vessels, the combination of a pair of vertical concentric tubes, end members extending across respective ends of said tubes and secured thereto to form a pair of concentric chambers, the latter being positioned to intersect the water line of the vessel, said end members each having ports therein communicating with the respective chambers, a differential generating foot adapted to be positioned in the water below the vessel water line, said foot having oppositely disposed upstream and downstream ports therein, conduits connecting said upstream and downstream ports with respective ports in the lower end member, an air pressure differential indicating unit having high and low pressure sides, a conduit connecting the high pressure side of said indicating unit with the respective port in the upper end member communicating with the upstream port of said foot, another conduit connecting the low pressure side of said indicating unit with the other port in said upper end member, and means in said last mentioned end member for admitting air into or expelling air from the respective chambers, to bring the water levels therein substantially on the water line of the vessel.

CLAUDE L. ROBINSON.